United States Patent
Stein et al.

(10) Patent No.: US 7,247,694 B2
(45) Date of Patent: Jul. 24, 2007

(54) PMI SYRUP PHASES AND THEIR USE FOR STABILIZING INSOLUBLE ADDITIVES

(75) Inventors: Peter Stein, Pfungstadt (DE); Werner Geyer, Muehltal (DE); Thomas Barthel, Heppenheim (DE); Franz Karlheinz Breitwieser, deceased, late of Griesheim (DE); by Ingrid Breitwieser, legal representative, Griesheim (DE); by Claudia Breitwieser, legal representative, Griesheim (DE); by Anja Breitwieser, legal representative, Griesheim (DE); by Bianca Breitwieser, legal representative, Griesheim (DE)

(73) Assignee: Röhm GmbH & Co. KG, Darmstadt (DE)

( * ) Notice: Subject to any disclaimer, the term of this patent is extended or adjusted under 35 U.S.C. 154(b) by 116 days.

(21) Appl. No.: 10/472,036

(22) PCT Filed: Mar. 5, 2002

(86) PCT No.: PCT/EP02/02365

§ 371 (c)(1),
(2), (4) Date: May 17, 2004

(87) PCT Pub. No.: WO02/077082

PCT Pub. Date: Oct. 3, 2002

(65) Prior Publication Data

US 2005/0014918 A1    Jan. 20, 2005

(30) Foreign Application Priority Data

Mar. 21, 2001    (DE) ................ 101 13 899

(51) Int. Cl.
*C08F 20/06* (2006.01)
(52) U.S. Cl. .................... 526/317.1; 526/319; 526/341
(58) Field of Classification Search ............ 526/317.1, 526/319, 341

See application file for complete search history.

(56) References Cited

U.S. PATENT DOCUMENTS 2,921,045 A    1/1960  Di Martino
5,374,688 A    12/1994 Besecke

FOREIGN PATENT DOCUMENTS

DE    199 17 987    10/2000
GB    721 641       1/1955

*Primary Examiner*—Robert D. Harlan
(74) *Attorney, Agent, or Firm*—Oblon, Spivak, McClelland, Maier & Neustadt, P.C.

(57) ABSTRACT

By using a high molecular weight syrup phase comprising PMMA or PMMI, it is possible to distribute fillers in the polymerization batch so that the distribution of the fillers remains homogeneous during the polymerization. A homogeneous foam results.

9 Claims, 2 Drawing Sheets

PMI SYRUP PHASES AND THEIR USE FOR STABILIZING INSOLUBLE ADDITIVES

FIELD OF THE INVENTION

The invention relates to
1. PMI syrup phases through polymer additives
2. use of the abovementioned phases for stabilizing insoluble additives The PMI syrup phases are polymerized in a first step and foamed in a second step. The foam product is available under the brand Rohacell® from Rohm GmbH. Rohacell® is a closed-pore foam, which is used, for example, in automotive construction and in aircraft construction.

PRIOR ART

The present invention relates to the field of the polymer blocks prepared by the casting process. Here, the monomers are filled between two plane-parallel plates—generally glass plates. An addition of insoluble additives is as a rule not possible since the distribution of the additive in the polymer becomes inhomogeneous owing to sedimentation. One solution to this problem is the use of highly viscous polymerization phases which are referred to below as syrup phases.

A syrup phase is distinguished by the fact that the viscosity of the solution prepared prior to the polymerization is substantially increased by a specific process. The use of a syrup phase in PMMA (polymethyl methacrylate) is known here, prepolymerization being effected and monomer being added continuously. Such a phase therefore consists of a monomer fraction and a polymer fraction and is to be referred to below as PMMA syrup phase. In this case, the final polymerization is also effected between two plane-parallel plates. By increasing the viscosity, it is possible, for example, to introduce insoluble colorants as well as other insoluble additives into the reaction batch in this manner so that their distribution is homogeneous and no sedimentation takes place during the polymerization carried out in the casting process.

The polymerization and the foaming are two separate process steps. WO90/2621 describes a foam comprising (meth)acrylic acid and (meth)acrylonitrile, acrylamide as a comonomer preventing the premature formation of precipitates during the polymerization. The foam formed is very uniform and the product has no internal stresses.

DE 197 17 483 describes a process for the preparation of polymethacrylimide foams to which 1-5% by weight, based on the monomer mixture, of MgO have been added. Foams having substantially improved thermomechanical properties are obtained.

DE 196 06 530 describes the addition of a flameproofing agent by means of polymethacrylimide foams. Aerosil is understood as meaning finely divided silicas.

Although the literature contains a detailed description of such PMMA syrup phases, PMI (polymethacrylimide) syrup phases are not mentioned. The term PMI syrup phase is to be extended below to describe solutions of one or more polymers of any type in the monomers required for the PMI preparation.

The synthesis of unsubstituted polymethacrylimides is effected as a rule by copolymerization of methacrylonitrile and methacrylic acid. The uncyclized or imidated prepolymer obtained as an intermediate is insoluble in its monomers. This prevents the preparation of a syrup in the manner described above, i.e. by prepolymerization.

The incorporation of insoluble components into the ROHACELL prepared by the casting process has been possible to date only to a limited extent. In each case, thickening of the batches is necessary in order to prevent sedimentation of the insoluble components during the polymerization. This was achieved in the past by four different possibilities.
1. By addition of Aerosil (Aerosil 200 from Degussa Hüls). Aerosil leads to a thixotropic suspension. Aerosil is understood as meaning finely divided silicas.
2. By addition of carbon black (KB 600 from AKZO Nobel). KB 600 leads to a thixotropic suspension.

None of the methods used leads to sufficient suppression of the sedimentation and said methods were therefore not considered further in research.

If methods 1 and 2 are employed, the incorporation of insoluble components presents problems owing to the thixotropic properties of the suspension. By using an Ultraturrax, thorough mixing is possible, but stirring techniques which, like the Ultraturrax, produce high shear fields and in this way introduce a large amount of energy into the reaction suspension, prevent the incorporation of initiators and suspended substances which may not be heated or comminuted. These include, for example, hollow microspheres or microencapsulated liquids or solids in addition to the abovementioned initiators.

Object

In order to make ROHACELL attractive for new applications, it is necessary to modify its electrical, magnetic or fire properties. This can very often be achieved with the aid of inorganic or other insoluble additives. It is therefore necessary to develop a method which makes it possible to incorporate insoluble additives as homogeneously distributed polymerized units into the ROHACELL prepared by the casting process.

As a result of the homogeneous distribution of the inorganic and of the other insoluble additives, the mechanical properties of the body produced using the syrup phase according to the invention do not deteriorate and the properties which were introduced by the inorganic and other insoluble additives are displayed. For this reason, it is intended to develop a PMI syrup phase.

ACHIEVEMENT

The object described above can be achieved by dissolving any desired polymer in the monomers required for the PMI preparation. These include, for example, PMMA and/or PMMI (poly-N-methylmethacrylimide), which are distinguished in the series of soluble polymers in particular by good incorporability.

The syrup phase resulting from addition of polymethyl methacrylate can be realized in particular by means of high molecular weight polymethyl methacrylate, the latter prepared in particular by emulsion polymerization. For example, the product Degalan BT 310 produced by Röhm serves for this purpose. The amount of dissolved PMMA is usually between 0.005 and 0.40 gram of PMMA per gram of monomer mixture which acts as a solvent.

The syrup phase resulting from addition of poly-N-methylmethacrylimide can be realized with the aid of an extrusion polymer. For example, the product Pleximid 8817 produced by Röhm serves for this purpose. PMMI—usually solvent-resistant—is surprisingly soluble in a mixture of methacrylonitrile and methacrylic acid. The amount of dissolved PMMI is usually between 0.005 and 0.60 gram of PMMI per gram of monomer mixture.

As expected, the polymerization is not influenced by the added polymers. Furthermore, the mechanical properties are not changed by the additions.

EXAMPLES

Example 1

Figure 1:
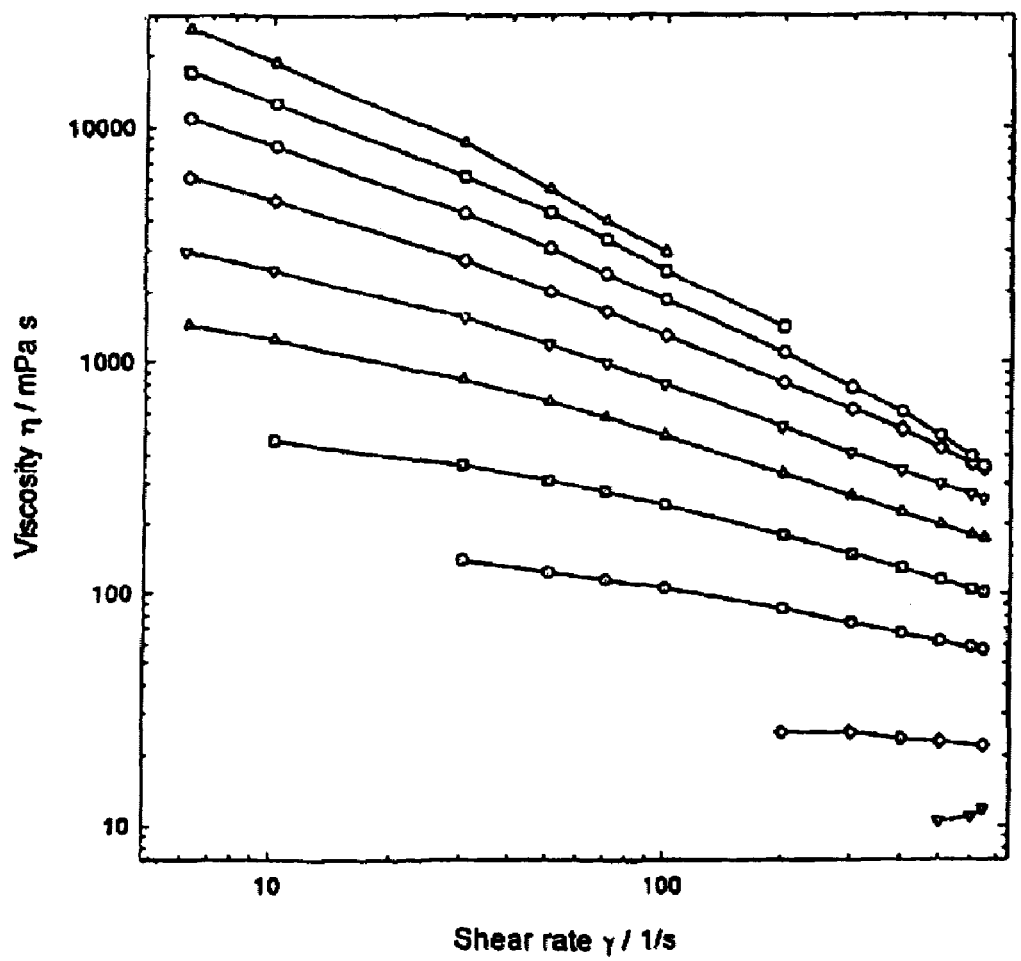
FIG. 1 shows the viscosity of the solutions of Example 1 as a function of the shear rate.

1.0 kg of polymethyl methacrylate (number average molecular weight: $4 \times 10^6$ g/mol) was dissolved in a mixture of 3.1 kg of methacrylonitrile and 6.9 kg of methacrylic acid. The stock solution thus prepared accordingly had a polymer concentration of 0.1 gram of polymer per gram of solvent. The stock solution was furthermore diluted to further concentrations with the same solvent mixture. The viscosity of the solutions was investigated at 23° C., as a function of the shear rate, according to DIN 53019 or ISO 3219. The results of this measurement are shown in FIG. 1. The concentrations c prepared were:

$$c = 0.100 \, \frac{g Polymer}{g Solvent}$$

(white, upward-pointing triangles in FIG. 1);

$$0.089 \, \frac{g Polymer}{g Solvent}$$

(whitesquares in FIG. 1);

$$0.078 \, \frac{g Polymer}{g Solvent}$$

(white circles in FIG. 1);

$$0.068 \, \frac{g Polymer}{g Solvent}$$

(white rhombi in FIG. 1);

$$0.058 \, \frac{g Polymer}{g Solvent}$$

(white, downward-pointing triangles in FIG. 1);

$$0.048 \, \frac{g Polymer}{g Solvent}$$

(grey, upward-pointing triangles in FIG. 1);

$$0.038 \, \frac{g Polymer}{g Solvent}$$

(grey squares in FIG. 1);

$$0.028 \, \frac{g Polymer}{g Solvent}$$

(grey circles in FIG. 1);

$$0.019 \, \frac{g Polymer}{g Solvent}$$

(grey rhombi in FIG. 1);

$$0.009 \, \frac{g Polymer}{g Solvent}$$

(grey, downward-pointing triangles in FIG. 1).

Example 2

Figure 2:
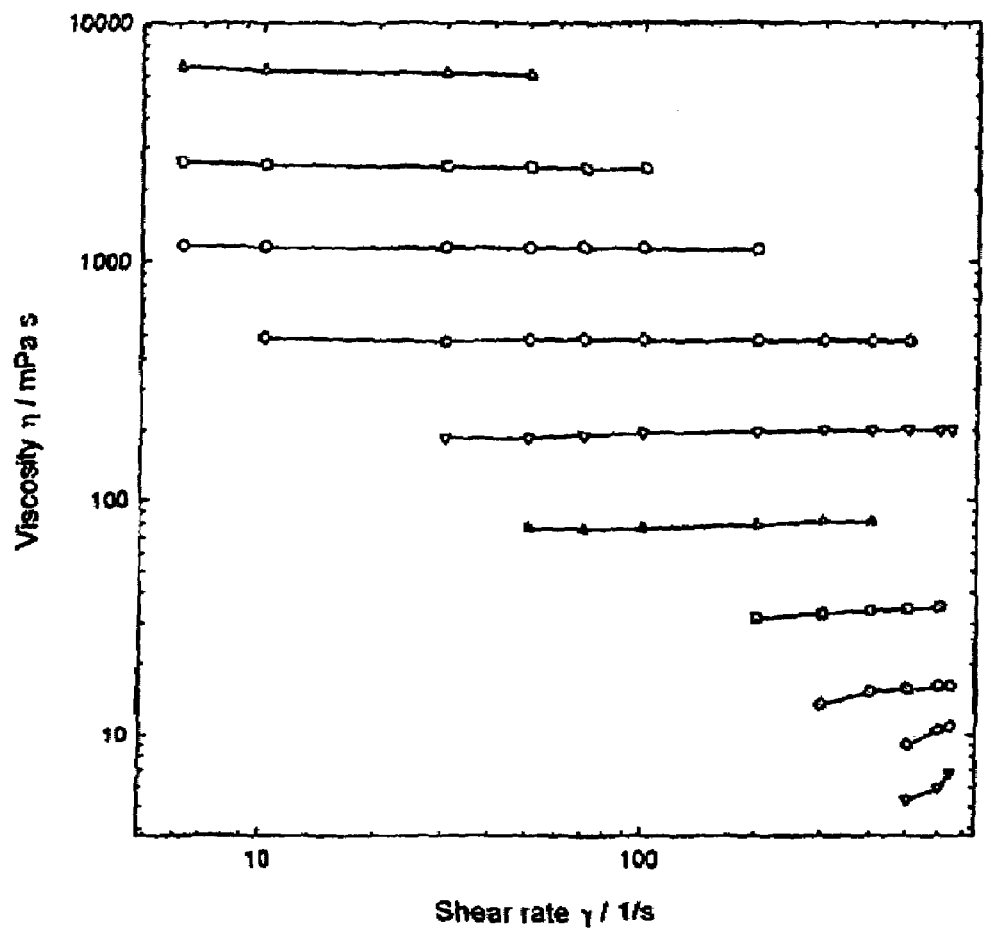
FIG. 2 shows the viscosity of the solutions of Example 2 as a function of the shear rate.

1.0 kg of poly-N-methylmethacrylimide (melt volume rate according to DIN 1133: 1 cm$^3$/min) were dissolved in a mixture of 4.38 kg of methacrylonitrile and 5.62 kg of methacrylic acid. The stock solution thus prepared accordingly had a polymer concentration of 0.1 gram of polymer per gram of solvent. The stock solution was furthermore diluted to further concentrations with the same solvent mixture. The viscosity of the solution was investigated at 23° C., as a function of the shear rate, according to DIN 53019 or ISO 3219. The results of this measurement are shown in FIG. 2. The concentrations c prepared were:

$$c = 0.50 \, \frac{g Polymer}{g Solvent}$$

(white, upward-pointing triangles in FIG. 2);

$$0.43 \, \frac{g Polymer}{g Solvent}$$

(white squares in FIG. 2);

$$0.36 \frac{g_{Polymer}}{g_{Solvent}}$$

(white circles in FIG. 2);

$$0.30 \frac{g_{Polymer}}{g_{Solvent}}$$

(white rhombi in FIG. 2);

$$0.02 \frac{g_{Polymer}}{g_{Solvent}}$$

(white, downward-pointing triangles in FIG. 2);

$$0.25 \frac{g_{Polymer}}{g_{Solvent}}$$

(grey, upward-pointing triangles in FIG. 2);

$$0.15 \frac{g_{Polymer}}{g_{Solvent}}$$

(grey squares in FIG. 2);

$$0.11 \frac{g_{Polymer}}{g_{Solvent}}$$

(grey circles in FIG. 2);

$$0.07 \frac{g_{Polymer}}{g_{Solvent}}$$

(grey rhombi in FIG. 2);

$$0.03 \frac{g_{Polymer}}{g_{Solvent}}$$

(grey, downward-pointing triangles in FIG. 2).

Example 3

295 g of isopropanol and 126 g of formamide were added as a blowing agent to a mixture of 5 260 g of methacrylic acid, 4 380 g of methacrylonitrile and 20 g of allyl methacrylate. Furthermore, 4 g of tert-butyl perbenzoate, 3 g of tert-butyl per-2-ethylhexanoate, 10 g of tert-butyl perbenzoate, 10.3 g of cumyl perneodecanoate and 15 g of mould release agent (e.g. PAT 1037; manufacturer: E. und P. Würtz GmbH & Co. KG) were added to the mixture. In order to increase the viscosity of the reaction mixture, 6 000 g of poly-N-methylmethacrylimide (melt volume rate according to DIN 1133: 1 cm$^3$/min) were dissolved in the mixture.

This mixture was polymerized for 43 h at 40° C. and then for 50 h at 50° C. in a chamber formed from two glass plates measuring 50×50 cm and having a 2.2 cm thick edge seal. For the final polymerization, the polymer was then subjected for 17.25 h to a heating programme ranging from 40° C. to 115° C. A subsequent foaming, which need not necessarily be carried out, was effected for 2 h at 210 and 220° C.

The foam thus obtained had a density of 65 and 50 kg/m$^3$, respectively.

Example 4

295 g of isopropanol and 126 g of formamide were added as a blowing agent to a mixture of 5 620 g of methacrylic acid and 4 380 g of methacrylonitrile. Furthermore, 4 g of tert-butyl perbenzoate, 4 g of tert-butyl per-2-ethylhexanoate, 10 g of tert-butyl perbenzoate, 10 g of cumyl perneodecanoate and 15 g of mould release agent (e.g. PAT 1037; manufacturer: E. und P. Würtz GmbH & Co. KG) were added to the mixture.

In order to increase the viscosity of the reaction mixture, 4 000 g of poly-N-methylmethacrylimide (melt volume rate according to DIN 1133: 1 cm$^3$/min) were dissolved in the mixture. 1 000 g of the product Melapur 200 from DSM were added as an insoluble component. Melapur is melamine polyphosphate.

This mixture was polymerized for 92 h at 40° C. and in a chamber formed from two glass plates measuring 50×50 cm and having a 2.2 cm thick edge seal. For the final polymerization, the polymer was then subjected for 17.25 h to a heating programme ranging from 40° C. to 115° C. A subsequent foaming, which need not necessarily be carried out, was effected for 2 h at 200, 210, 225 and 230° C.

The foam thus obtained had a density of 106, 79, 60 and 54 kg/m$^3$, respectively. All foams thus obtained showed no settling out of the insoluble component.

Example 5

290 g of isopropanol and 290 g of formamide were added as a blowing agent to a mixture of 5 000 g of methacrylic acid, 5 000 g of methacrylonitrile and 17 g of allyl methacrylate. Furthermore, 4 g of tert-butyl perbenzoate, 3.6 g of tert-butyl per-2-ethylhexanoate, 10 g of tert-butyl perbenzoate, 10.3 g of cumyl perneodecanoate and 16 g of mould release agent (e.g. PAT 1037; manufacturer: E. und P. Würtz GmbH & Co. KG) were added to the mixture.

In order to increase the viscosity of the reaction mixture, 350 g of polymethyl methacrylate (number average molecular weight: 4×10$^6$ g/mol) were dissolved in the mixture.

This mixture was polymerized for 40.5 h at 40° C. and in a chamber formed from two glass plates measuring 50×50 cm and having a 2.2 cm thick edge seal. For the final polymerization, the polymer was then subjected for 17.25 h to a heating programme ranging from 40° C. to 115° C. A subsequent foaming, which need not necessarily be carried out, was effected for 2 h at 220, 220 and 230° C.

The foam thus obtained had a density of 99, 52 and 42 kg/m$^3$, respectively.

Example 6

290 g of isopropanol and 290 g of formamide were added as a blowing agent to a mixture of 5 620 g of methacrylic acid, 4 380 g of methacrylonitrile and 17 g of allyl methacrylate. Furthermore, 4 g of tert-butyl perbenzoate, 3.6 g of tert-butyl per-2-ethylhexanoate, 10 g of tert-butyl perbenzoate, 10.3 g of cumyl perneodecanoate and 16 g of mould release agent (e.g. PAT 1037; manufacturer: E. und P. Würtz GmbH & Co. KG) were added to the mixture. In order to increase the viscosity of the reaction mixture, 350 g of polymethyl methacrylate (number average molecular weight: $4 \times 10^6$ g/mol) were dissolved in the mixture.

This mixture was polymerized for 40.5 h at 40° C. and in a chamber formed from two glass plates measuring 50×50 cm and having a 2.2 cm thick edge seal. For the final polymerization, the polymer was then subjected for 17.25 h to a heating programme ranging from 40° C. to 115° C. A subsequent foaming, which need not necessarily be carried out, was effected for 2 h at 200, 220 and 230° C.

The foam thus obtained had a density of 94, 51 and 40 kg/m³, respectively.

Example 7

216 g of water and 242 g of formamide were added as a blowing agent to a mixture of 3 132 g of methacrylic acid and 2 004 g of methacrylonitrile. Furthermore, 2.06 g of tert-butyl perbenzoate, 2.06 g of tert-butyl per-2-ethylhexanoate, 3.82 g of tert-butyl perbenzoate, 5.12 g of cumyl perneodecanoate, 36 g of zinc oxide and 7.68 g of mould release agent (e.g. PAT 1037; manufacturer: E. und P. Würtz GmbH & Co. KG) were added to the mixture. In order to increase the viscosity of the reaction mixture, 256.5 g of polymethyl methacrylate (number average molecular weight: $4 \times 10^6$ g/mol) were dissolved in the mixture.

This mixture was polymerized for 92 h at 41° C. and in a chamber formed from two glass plates measuring 50×50 cm and having a 2.2 cm thick edge seal. For the final polymerization, the polymer was then subjected for 17.25 h to a heating programme ranging from 40° C. to 115° C. A subsequent foaming, which need not necessarily be carried out, was effected for 2 h at 180° C.

The foam thus obtained had a density of 60 kg/m³.

The invention claimed is:

1. A process for the preparation of a material, said process comprising:
   preparing a copolymer of a vinylically unsaturated carboxylic acid and a vinylically unsaturated carboxylic acid derivative by a casting method, wherein the polymerization is carried out in a syrup phase, of a polymer soluble in a monomer mixture required for the preparation of polymethacrylimide;
   wherein the material comprises between 0 and 400 parts by weight, based on the total mass of polymerizable groups, of fractions which are insoluble in the reaction mixture required for the preparation of the material; and
   wherein the material is a foam.

2. The process according to claim 1, wherein the syrup phase comprises polymethyl methacrylate and the number average molecular weight of the polymethyl methacrylate is between 1 000 000 g/mol and 12 000 000 g/mol.

3. The process according to claim 1, wherein the syrup phase comprises polymethacrylimide and the number average molecular weight of the polymethacrylimide is between 50 000 g/mol and 500 000 g/mol.

4. A material prepared by a process, comprising:
   preparing a copolymer of a vinylically unsaturated carboxylic acid and a vinylically unsaturated carboxylic acid derivative by a casting method, wherein the polymerization is carried out in a syrup phase, of a polymer soluble in a monomer mixture required for the preparation of polymethacrylimide;
   wherein the material comprises between 0 and 400 parts by weight, based on the total mass of polymerizable groups, of fractions which are insoluble in the reaction mixture required for the preparation of the material; and
   wherein the material is a foam.

5. The material according to claim 4, comprising between 0 and 400 parts by weight, based on the total mass of polymerizable groups, of fractions which are soluble in the reaction mixture required for the preparation of the material.

6. The material according to claim 4, wherein the vinylically unsaturated carboxylic acid is methacrylic acid.

7. The material according to claim 4, wherein the vinylically unsaturated carboxylic acid derivative is methacrylonitrile.

8. The material according to claim 4, wherein the weight ratio of the vinylically unsaturated carboxylic acid and of the vinylically unsaturated carboxylic acid derivative is between 80:20 and 40:60.

9. The material according to claim 4, wherein the amount of syrup phase is between 0.005 and 0.6 gram of polymer per gram of monomer mixture, the monomer mixture accounting for the sum of the masses of the vinylically unsaturated monomers.

\* \* \* \* \*